June 18, 1968   W. E. HYVARINEN   3,389,326
EXCITER FIELD CONTROL FOR DYNAMOELECTRIC MACHINES
Filed Oct. 15, 1965
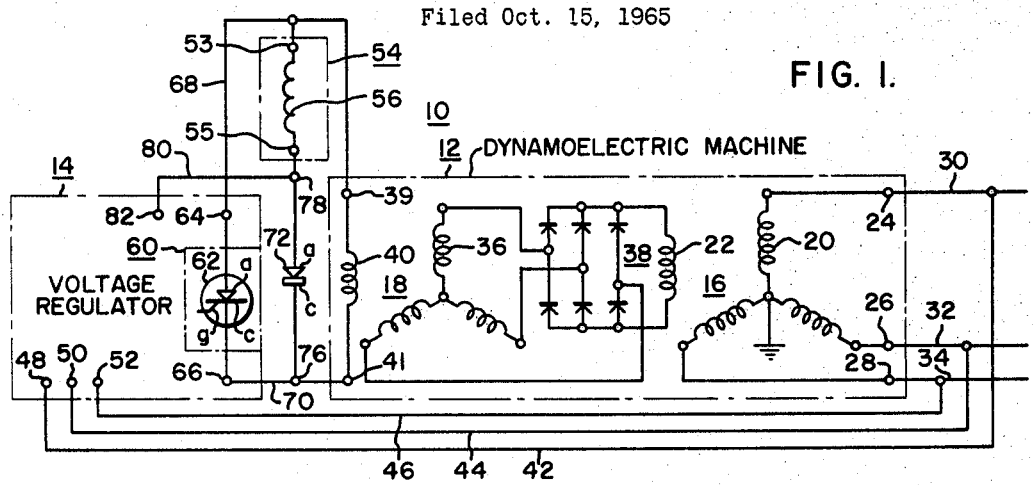
FIG. 1.
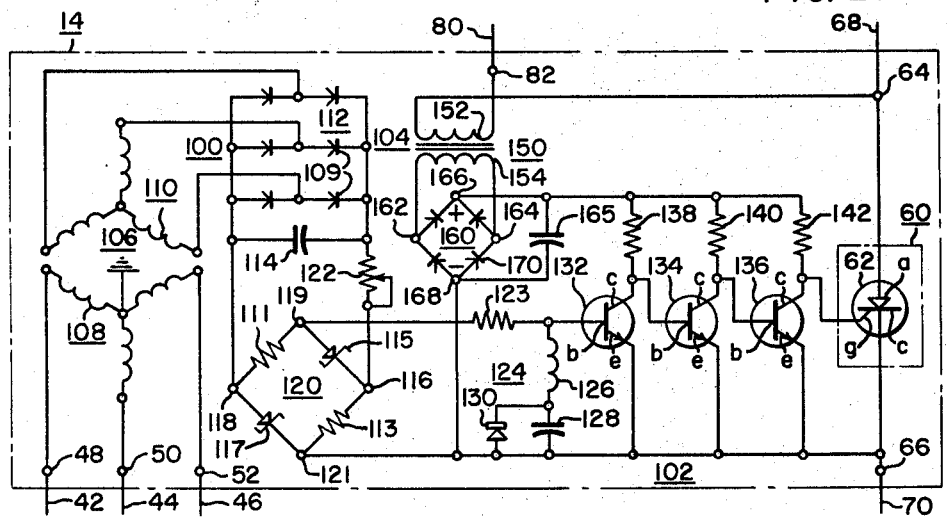
FIG. 2.
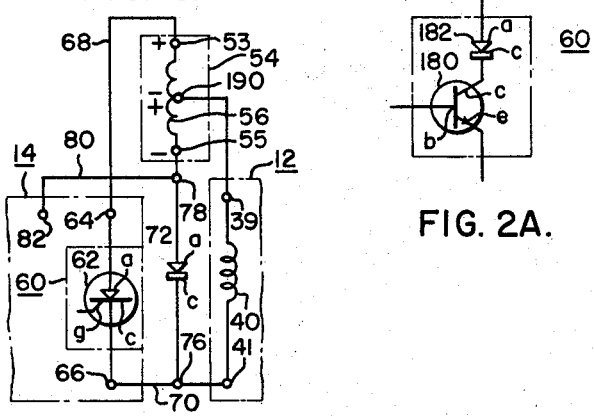
FIG. 3.
FIG. 2A.
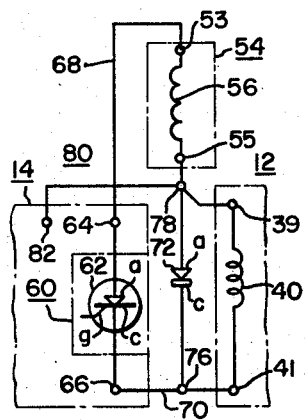
FIG. 4.

United States Patent Office 3,389,326
Patented June 18, 1968

3,389,326
EXCITER FIELD CONTROL FOR DYNAMO-ELECTRIC MACHINES
Wayne E. Hyvarinen, American Township, Lima, Ohio, assignor to Westinghouse Electric Corporation, Pittsburgh, Pa., a corporation of Pennsylvania
Filed Oct. 15, 1965, Ser. No. 496,418
8 Claims. (Cl. 322—28)

ABSTRACT OF THE DISCLOSURE

Exciter field control for regulated dynamoelectric machines which utilizes a source of alternating potential having a frequency selected such that the time constant of the exciter field is long compared to one cycle of the source potential. The source of alternating potential is thus applied directly to the power amplifier of the associated voltage regulator without power rectifiers.

---

This invention relates in general to electrical power generating systems, and more particularly to control apparatus for electrical power generating systems.

The designer of aircraft electrical power generating systems is constantly striving to reduce the number of components in the system and the number of electrical leads between components, in order to reduce the size, weight and cost of package, and still maintain the high degree of reliability and performance required by such systems. If the components which may be eliminated are power components, such as the components which carry the field excitation current of the exciter, the designer not only achieves a size, weight and cost reduction, but also reduces the amount of heat produced by the system with a corresponding increase in system efficiency, and increase in system reliability.

The regulating systems utilized with aircraft electrical power generating systems generally use semiconductor components, with the power amplifier usually including a transistor or controlled rectifier which is connected in series circuit relation with the exciter field and a source of unidirectional potential. Since many of these generating systems are required to operate independently of any external source of electrical power, a generator such as a permanent magnet generator with a rectifier circuit is provided to furnish the source of electrical power for the exciter field, as well as the source of potential for the operation of the voltage regulator system. Thus, the exciter field power must pass through the power amplifier of the voltage regulator, and the power diodes required to rectify the output voltage of the permanent magnet generator. The power diodes, along with their associated heat sinks, take up considerable room in the regulator system, and add substantially to the weight, cost and heat loss of the system. It would be desirable to eliminate the normal rectification circuit with its power diodes from the regulating system. It would also be desirable if the maximum effective current that the remaining power components must carry could be substantially reduced, in order to further reduce the power dissipation of the system and the size of the components, and increase their reliability.

Accordingly, it is an object of the invention to provide a new and improved regulating system for electrical power generating systems.

Another object of the invention is to reduce the number of power components required in aircraft electrical power generating systems.

A further object of the invention is to reduce the size, weight and cost, and increase the efficiency of aircraft electrical power systems, without adversely affecting the reliability and performance of the system.

Another object of the invention is to eliminate the conventional power rectifier circuit between the source of electrical potential and the excitation winding of the exciter, in electrical power generating systems.

Still another object of the invention is to substantially reduce the maximum effective current that the power components of aircraft electrical regulating systems are required to carry.

A further object of the invention is to reduce the number of electrical leads required between certain of the components in aircraft electrical power generating systems.

Briefly, the present invention accomplishes, the above cited objects in certain embodiments of the invention, by recognizing that the inductive-resistive characteristics of the exciter field winding may be used to eliminate the conventional rectifier circuit between the single phase alternating current supply voltage and the exciter field. This is accomplished by selecting the frequency of the source potential such that the time constant of the exciter field circuit is long relative to the time of one cycle of the source potential. The source potential may be a permanent magnet generator having a single phase alternating current output. One embodiment of the invention utilizes a permanent magnet generator having an untapped output winding, with the permanent magnet generator winding and a serially connected asymmetrically conductive device being connected across the field excitation winding, and the power amplifier of the voltage regulator being connected across the field excitation winding. When the power amplifier is conducting, on one-half cycle of the output voltage of the permanent magnet generator, current flows through the permanent magnet generator winding, through the asymmetrically conductive device, and through the exciter field. On the next half cycle, the current flows through the circuit provided by the power amplifier, and no current flows through the permanent magnet generator winding and the asymmetrically conductive device. When the power amplifier is not conductive, the average direct current field voltage and excitation current are near zero, never building up due to the long time constant of the exciter field relative to the time of one cycle of the output voltage of the permanent magnet generator, even though the instantaneous voltage on the exciter field is an alternating potential of high magnitude. Thus, the conventional rectifier circuit has been eliminated between the permanent magnet generator and the field excitation winding, and the power amplifier only conducts current one-half the time that it would in conventional control schemes, reducing the power dissipation in the power amplifier.

Another embodiment of the invention utilizes a source of potential having a center tapped winding, such as a permanent magnet generator, which supplies a full wave rectified potential to the exciter field winding when the power amplifier is conductive, and substantially zero current and substantially zero average excitation voltage when the power amplifier is not conductive, due to the field excitation winding time constant and permanent magnet generator voltage cycle relationship hereinbefore mentioned.

Still another embodiment of the invention reduces the power components and electrical leads by utilizing a single phase source of alternating potential having an untapped winding, such as a permanent magnet generator, and disconnecting the permanent magnet generator winding from the exciter field when the power amplifier is non-conductive, and connecting the permanent magnet generator winding to the field when the power amplifier is conductive. The permanent magnet generator supplies a half wave rectified potential to the field excitation winding in this embodiment.

Further objects and advantages of the invention will become apparent as the following description proceeds and features of novelty which characterize the invention will be pointed out in particularity in the claims annexed to and forming a part of this specification.

For a better understanding of the invention, reference may be had to the following detailed description taken in connection with the accompanying drawings, in which:

FIGURE 1 is a schematic diagram of a regulated electrical power generating system utilizing the teachings of one embodiment of the invention, FIG. 2 is a schematic diagram of a voltage regulator which may be used in the system of FIG. 1, FIG. 2A illustrates an alternative arrangement of the voltage regulator shown in FIG. 2, FIG. 3 is a schematic diagram illustrating another embodiment of the invention, and FIG. 4 is a schematic diagram illustrating still another embodiment of the invention.

Referring now to the drawings, and FIG. 1 in particular, there is shown a regulated electrical power generator system 10, including a dynamoelectric machine 12 and voltage regulator 14. The dynamoelectric machine 12 is typical of the electrical generator and exciter combinations utilized in aircraft electrical systems, and includes a two stage brushless generator having a main generator 16 and an exciter 18. The main generator 16 includes a stationary armature 20 and a rotating excitation field winding 22. The armature 20 is connected to output terminals 24, 26 and 28, which are connected to the load conductors 30, 32 and 34, respectively. The excitation field winding 22 has its excitation current supplied by the exciter 18. Exciter 18 includes a rotating armature 36, disposed on the same shaft as the rotating field winding 22, a rectifier bridge arrangement 38, which is also disposed on the common shaft, and a stationary field excitation winding 40. The exciter armature 36, bridge rectifier arrangement 38 and main generator excitation field winding 22 are driven by a suitable prime mover (not shown), with the polyphase alternating potential developed in the exciter armature 36 being rectified by rectifier bridge arrangement 38 and applied to the main field excitation winding 22. The voltage magnitude generated by the main generator armature 20 depends upon the magnitude of the excitation current supplied to its field excitation winding 22 by exciter 18. The magnitude of the excitation current supplied by exciter 18 depends upon the output voltage of exciter armature 36, which is determined by the excitation current flowing through the excitation field winding 40. The current flowing in the exciter excitation field winding 40 is determined by voltage regulator 14, which is responsive to the voltage on load conductors 30, 32 and 34 through conductors 42, 44 and 46, which are connected between terminals 48, 50 and 52 on voltage regulator 14 and load conductors 30, 32 and 34, respectively. Voltage regulator 14 may be of any suitable type, with only its power amplifier 60 being shown in FIG. 1. In this instance, the power amplifier is illustrated as a controlled rectifier 62, but any suitable device may be utilized, such as a transistor.

The source of potential for supplying the excitation current to the exciter field winding 40, and for supplying the potential for operation of the various circuits in voltage regulator 14, may be a single phase permanent magnet generator 54 having an armature winding 56, output terminals 53 and 55, and a predetermined output frequency. The conventional arrangement would be to rectify the output voltage of permanent magnet generator 54 and connect the rectified output voltage in series circuit relation with the terminals 64 and 66 of power amplifier 60 and the terminals 39 and 41 of exciter field winding 40. A commutating or free wheeling diode would be connected directly across the field winding 40 to provide a path for the excitation current when the power amplifier switches to a nonconductive condition. Two additional electrical leads would be required between the output of the permanent magnet generator 54 and voltage regulator 14 to obtain a potential for the operation of the voltage regulator circuits, with the alternating output voltage of the permanent magnet generator being transformed to the desired magnitude and rectified in the voltage regulator 14. Thus, four leads would be required between the voltage regulator 14, and the permanent magnet generator 54 and exciter field winding 40, as well as the power diodes for rectifying the output voltage of the permanent magnet generator 54 which is applied to the field excitation winding 40.

FIGURE 1 illustrates an embodiment of the invention which reduces the number of interconnecting leads from 4 to 3, and eliminates the conventional rectifier circuit for providing a potential for the exciter field winding 40, which therefore eliminates the heat dissipating power diodes and their associated heat sinks. The arrangement of FIG. 1 also results in the power amplifier 60 carrying exciter field current one half the time that it would be in conventional arrangements, and the conventional free wheeling diode across the field winding is not utilized. The method of operation of the embodiment of FIG. 1 is not readily apparent, even from the circuit diagram, as the success of the arrangement is due to the characteristics of the exciter field winding 40. The exciter field winding 40, having a high inductance, possesses a relatively long time constant. This characteristic is utilized to eliminate the power rectifiers by selecting a permanent magnet generator 54 which has a frequency of sufficient magnitude that the time constant of the field winding 40 is long compared to the time of one voltage cycle of the permanent magnet generator 54.

More specifically, power amplifier 60 of voltage regulator 14 has its output terminals 64 and 66 connected in circuit relation with permanent magnet generator winding 56 and an asymmetrically conductive device 72, which may be a diode or rectifier having an anode electrode $a$ and a cathode electrode $c$. The power amplifier 60 may be a silicon controlled rectifier 62 having an anode electrode $a$, a cathode electrode $c$, and a gate electrode $g$, with the anode electrode $a$ of controlled rectifier 62 being connected to terminal 53 of permanent magnet generator winding 56, and the cathode electrode $c$ being connected to the cathode electrode $c$ of the asymmetrically conductive device 72. The anode electrode $a$ of asymmetrically conductive device 72 is connected to output terminal 55 of the permanent magnet generator winding 56. Terminal 41 of exciter field winding 40 is connected to the common connection of the cathode electrodes of controlled rectifier 62 and asymmetrically conductive device 72 at terminal 76, and terminal 39 of exciter field winding 40 is connected to output terminal 53 of the permanent magnet generator winding 56.

Since it is also necessary to furnish the output potential of the permanent magnet generator 54 to the voltage regulator 14, for purposes of being transformed to the desired magnitude and rectified for use in the various circuits of the voltage regulator 14, it is necessary to connect output terminal 55 to voltage regulator 14 at terminal 82, as shown by electrical conductor 80 which connects terminal 82 with the junction 78 between the asymmetrically conductive device 72 and the output terminal 55 of the permanent magnet generator 54. Terminal 53 of permanent magnet generator 54 is already connected to the voltage regulator at terminal 64. It will be noted that only three conductors are required to connect the voltage regulator 14 with the permanent magnet generator 54 and exciter field winding 40, these conductors being conductor 80 between voltage regulator terminal 82 and output terminal 55 of the permanent magnet generator 54, conductor 68 which connects the output terminal 53 of the permanent magnet generator 54 with terminal 64 of voltage regulator 14, and conductor 70 which connects terminal 66 of voltage regulator 14 with the asymmetrically conductive device 72 and exciter field winding 40.

In the operation of the electrical power generating system shown in FIG. 1, we will first assume that the power amplifier 60 is in its conductive condition. When the output voltage of permanent magnet generator 54 is in the portion of its voltage cycle which makes output terminal 55 positive with respect to output terminal 53, current will flow through the permanent magnet generator winding 56, through asymmetrically conductive device 72, and through exciter field winding 40. When the polarity of the output voltage of permanent magnet generator 54 reverses, the excitation current flowing in exciter field winding 40 will now flow through power amplifier 60. There will be no current flow in the permanent magnet generator winding 56 during this half cycle due to the blocking action of the asymmetrically conductive device or diode 72. The excitation current thus "free wheels" through the power amplifier 60 on one half of a voltage cycle of the permanent magnet generator 54, dropping less than it built up on the previous half cycle. This process continues until the excitation current builds up to its maximum value. Thus, the voltage applied to exciter field winding 40 when power amplifier 60 is conductive, is the half wave rectification of the permanent magnet generator voltage, and the power amplifier 60 carries the field excitation current only one half the time that it would in conventional control arrangements.

Now, assume that the power amplifier 60 is in its non-conductive condition. When output terminal 55 is more positive than output terminal 53, of the winding 56 of the permanent magnet generator 54, current will flow through the permanent magnet generator winding 56, through diode 72, and through the exciter field winding 40. When the polarity of the output voltage of the permanent magnet generator 54 changes, there is no free wheeling path for the excitation current through the power amplifier 60. The exciter current thus tries to flow through the permanent magnet generator 56, but is "bucked" by the reverse voltage of the permanent magnet generator 54 back to substantially zero. This process continues each voltage cycle, with the excitation current never building up in the exciter field winding 40 beyond that to which it builds in one half cycle of the output voltage of the permanent magnet generator 54. Further, the average unidirectional field voltage across the exciter field winding 40 would be close to zero, even though the instantaneous exciter field voltage is an alternating current voltage of high magnitude, being the instantaneous voltage generated by the permanent magnet generator 54 less the voltage drop in the diode 72. The amount of current flowing in the exciter field winding 40 when the power amplifier 60 is in its non-conductive condition depends upon the time constant of the exciter field winding 40 and the frequency of the permanent magnet generator voltage. For example, using an exciter field winding 40 with a 10 millisecond time constant and a permanent magnet generator 54 having an output voltage with a frequency of 2800 c.p.s., the excitation current with the power amplifier 60 in its non-conductive condition is 1% of the value that it is when the power amplifier is in its conductive condition.

The voltage regulator 14 may be of any suitable type which utilizes a power amplifier which operates in the switching mode to develop the average unidirectional potential across the exciter field required to provide the desired voltage regulation of the dynamoelectric machine 12. For example, FIG. 2 illustrates a typical voltage regulator 14 which may be utilized. Briefly, the voltage regulator 14 shown in FIG. 2 includes an error detector circuit 100, an amplifier circuit 102, and a power supply circuit 104. The error detector circuit 100 includes a sensing transformer 106, which has a primary winding 108 and a secondary winding 110. The primary winding 108 is connected to terminals 48, 50 and 52 and load conductors 30, 32 and 34, through conductors 42, 44 and 46. The output voltage appearing on the load conductors is transformed to a usable magnitude by secondary winding 110 and is rectified in a three-phase full wave bridge rectifier arrangement 112, which includes a plurality of diodes 109.

The output voltage of rectifier arrangement 112 is filtered by capacitor 114, and the rectified potential applied to the input terminals 116 and 118 of Zener error detecting or reference bridge arrangement 120. The Zener reference bridge arrangement 120 includes two similar resistors 111 and 113 disposed in opposite legs of the bridge, and two similar Zener diodes 115 and 117 disposed in the remaining two legs, respectively. A deviation of the output voltage on conductors 30, 32 and 34 from the reference voltage appears at the output terminals 119 and 121 as an error signal. The reference voltage is determined by the setting of adjustable resistor 122 and the reference voltage of the Zener bridge 120, which is determined by twice the voltage drop across one of the Zener diodes. The output voltage or error signal of Zener bridge 120 is a polarized direct current voltage with a small ripple voltage. The polarity of this error signal depends upon whether the output voltage to be regulated is above or below the reference voltage of Zener bridge 120. The error signal is applied through resistor 123 and L-C compensation network 124, which includes an inductor 126, capacitor 128, and diode 130, to the amplifier circuit 102. The amplifier circuit 102 includes preamplifier circuits which include transistors 132, 134 and 136, which may be of the n-p-n junction type having a base electrode b, emitter electrode e and collector electrode c, and resistors 138, 140 and 142. The supply potential for the operation of the amplifier circuit 102 is obtained from the output of the permanent magnet generator 54, shown in FIG. 1, which is applied to terminals 82 and 64 of voltage regulator 14. The permanent magnet generator voltage is applied to the power supply circuit 104 which includes a transformer 150, a full-wave, single-phase bridge rectifier circuit 160, and capacitor 165. The transformer 150 provides the voltage magnitude required for the operation of the amplifier circuit 102. The transformer 150 has a primary winding 152 connected to terminals 82 and 64 of voltage regulator 14, and a secondary winding 154 connected to the input terminals 162 and 164 of bridge rectifier 160. Bridge rectifier 160, which includes a plurality of diodes 170, has its output terminals 166 and 168 connected across the amplifier circuit 102, with the positive terminal 166 being connected to the collector electrodes c of transistors 132, 134 and 136 through resistors 138, 140 and 142, respectively, and the negative terminal 168 being connected to the emitter electrodes e of transistors 132, 134 and 136. The output of the preamplifier circuit, appearing across the collector-emitter electrodes of transistor 136 is applied to the power amplifier 60, which in this instance, since the power amplifier 60 is a controlled rectifier 62, is connected across the gate-cathode electrodes of controlled rectifier 62.

In the operation of the voltage regulator 14, the error signal from Zener bridge 120 is applied across the base-emitter electrodes of transistor 132. If the voltage of the output conductors 30, 32 and 34 of dynamoelectric machine 12 shown in FIG. 1, is higher than the desired magnitude, terminal 121 will be negative relative to terminal 119, and the amplifier circuit 102 will not be switched or turned on. Since the power amplifier 60 is non-conductive, the excitation current in excitation field winding 40 will decrease, decreasing the output voltage of dynamoelectric machine 12. When the output voltage decreases below the desired voltage, terminal 121 of Zener bridge 120 becomes positive with respect to terminal 119, and transistor 132 will be reverse biased, switching to its non-conductive condition which forward biases transistor 134. When transistor 134 is forward biased, it switches to its conductive condition, which shorts the bias to transistor 136. When transistor 136 is not forward biased, it is in its non-conductive condition, thus applying bias to the gate electrode g of the controlled rectifier 62. With transistor 136 switched to its non-conductive condition a signal is applied to the gate electrode g of control rectifier 62, which switches it to its conductive condition if the anode electrode a is more positive than the cathode electrode c. Once turned on, the controlled rectifier 62 will remain conductive until its cathode c becomes more positive than its anode a. If the output voltage is below the reference voltage, the gate signal would be continuous, turning on controlled rectifier 62 each positive half cycle of the frequency of the permanent magnet generator 54.

At steady state, when the output voltage on load conductors 30, 32 and 34 is substantially at the desired magnitude, the ripple in the error signal, which is six times the frequency of the output voltage of the dynamoelectric machine 12, will pulse or forward bias the amplifier circuit 102 for a short period of time at the ripple frequency, thus applying gating signals to the controlled rectifier 62 at the ripple frequency. The time during each ripple cycle that the controlled rectifier 62 is pulsed depends upon the magnitude of the direct current portion of the error signal, which pulse width modulates the time that power amplifier 60 is in its conductive mode. This pulse width modulation method of control will operate satisfactorily in this application even though the potential applied to the power amplifier is alternating, due to the relatively high frequency of the output potential of the permanent magnet generator 54. The average voltage applied to the exciter field winding 40 is substantially equal to the average time the power amplifier 60 is turned on times the voltage across the exciter field 40 when the power amplifier 60 is turned on. The inductance of the exciter field winding 40 keeps the exciter field current smooth, as its time constant is long relative to the switching rate.

In the event it is desirable to utilize a transistor instead of a controlled rectifier for the power amplifier 60, FIG. 2A illustrates a direct replacement for the controlled rectifier 62 shown in FIG. 2. FIG. 2A illustrates a transistor 180 which may be of the n-p-n junction type having a base electrode b, emitter electrode e and a collector electrode c, and a diode or rectifier 182 having an anode electrode a and a cathode electrode c. The cathode electrode c of the diode 182 is connected to the collector electrode c of transistor 180. The anode electrode a of diode 182 would be connected to terminal 64, and the emitter electrode e of transistor 180 would be connected to the emitter electrode e of transistor 136 and terminal 66, and the base electrode b of transistor 180 would be connected to the collector electrode c of transistor 136. The operation of voltage regulator 14 with the power amplifier shown in FIG. 2A would be similar to that described relative to the use of controlled rectifier 62, except that transistor 180 would be conductive only during the time that base drive is applied to its base electrode b, unlike the controlled rectifier, which is conductive once switched to its conductive condition until the current falls below its holding magnitude.

The arrangement of FIG. 1 illustrates an embodiment of the invention wherein a single phase supply voltage 54, such as a permanent magnet generator, is applied directly to the power amplifier 60 and exciter field winding 40, with the voltage applied to the exciter field winding 40 when the power amplifier 60 is conductive being the half wave rectification of the supply voltage.

FIG. 3 illustrates an arrangement which utilizes a source of alternating potential 54, such as a permanent magnet generator, which has a center tap 190 on the output winding 56. Like reference numerals in FIGS. 1 and 3 indicate like components. In general, the change in circuitry required when using a center tapped supply voltage is the connecting of terminal 39 of exciter field winding 40 to the center tap 190, instead of to the output terminal 53 of the source potential 54. When the power amplifier 60 is in its conductive condition, and the permanent magnet generator winding 56 has the polarity shown in FIG. 3, current flows from the center tap 190 of winding 56, through one-half of winding 56, through power amplifier 60, through exciter field winding 40, and back to the center tap 190. When the polarity of winding 56 reverses, and is opposite to the polarities shown in FIG. 3, current will flow from the center tap 190 of the winding 56, through the other one-half of winding 56, through diode 72, through exciter field winding 40, and back to the center tap 190. Thus, when power amplifier 60 is conductive, winding 56 is supplying a full-wave rectified voltage to the exciter field winding 40. It should be noted that similar to the arrangement of FIG. 1, the power amplifier 60 carries excitation current only fifty percent of the time that it would with conventional control arrangements.

When power amplifier 60 is non-conductive, the portion of the winding 56 connected to the power amplifier 60 is effectively open circuited, and the resulting circuit is essentially the same as the circuit of FIG. 1 when the power amplifier 60 is in its non-conductive condition. In other words, on one half cycle of the permanent magnet generator output voltage, when terminal 55 is more positive than center tap 190, current will flow from winding 56 through diode 72 and exciter field winding 40 back to the winding 56. On the next half cycle the current from exciter field winding 40 attempts to flow through the winding 56, but is "bucked" by the voltage of the winding 56, as the center tap 190 is now more positive than terminal 55. Therefore, the current in the exciter field winding 40 never builds up beyond the magnitude to which it would build up in one half cycle of the voltage of permanent magnet generator 54. Since the time constant of the exciter field winding 40 is long compared to one cycle of the output voltage of the permanent magnet generator 54, which has a relatively high frequency, the average voltage across exciter field winding 40 and the average excitation current through the field excitation winding 40 will be at a very low magnitude, near zero, even though the instantaneous exciter field voltage is that being produced by the permanent magnet generator 54 less the voltage drop in diode 72.

The voltage regulator 14 may be that shown in FIG. 2 and hereinbefore described, or any other suitable regulator, and the dynamoelectric machine 12 may be that shown in FIG. 1, or any other suitable dynamoelectric machine.

In the embodiment of the invention shown in FIGS. 1 and 3, the permanent magnet generator winding 56 and the diode 72 are connected serially across the power amplifier, with the exciter field winding 40 being connected to terminal 53 of winding 56 in the embodiment of FIG. 1, and the exciter field winding 40 being connected to the center tap 190 of winding 56 in the embodiment of FIG. 3. FIG. 4 illustrates still another embodiment of the invention wherein the exciter field winding 40 is connected to terminal 55 of winding 56. Like the embodiments of FIGS. 1 and 3, the embodiment of FIG. 4 has the same advantages of having only three leads between the voltage regulator 14, and the permanent magnet generator 54 and dynamoelectric machine 12, the elimination of the conventional rectifier circuit along with its heat dissipating power diodes, and the reduced duty cycle on the power amplifier 60, which is equal to one half the duty cycle imposed upon power amplifier 60 in conventional control arrangements.

In general, the embodiment of the invention illustrated in FIG. 4 is similar to the embodiment illustrated in FIG. 1, utilizing a single phase untapped supply 54, which may be a permanent magnet generator having a winding 56, but instead of connecting terminal 39 of the excited field winding 40 to terminal 53 of winding 56, terminal 39 is connected in this instance to terminal 55 of winding 56. In this embodiment of the invention, when power amplifier 60 is conductive and terminal 53 of winding 56 is more positive than terminal 55, current will flow through power amplifier 60, exciter field winding 40, and back to the winding 56. When the polarity of winding 56 reverses, current in exciter field winding 40 will flow through diode 72.

When power amplifier 60 is non-conductive, winding 56 will be effectively open circuited. Thus, there will be no current flow through winding 56, and the current flowing in the exciter field winding 40 will gradually decrease, flowing in the circuit which includes diode 72. Since the winding 56 is open circuited when power amplifier 60 is in its non-conductive condition, the time constant of the exciter field relative to the time of one cycle of the frequency of the output voltage of permanent magnet generator 54 is not as important, and the output frequency of the permanent magnet generator may be much lower than in the other embodiments. However, the output frequency of the permanent magnet generator should be of sufficient magnitude relative to the field time constants of the exciter and generator to prevent modulating their output voltages at the frequency of the power source.

The voltage regulator 14 and dynamoelectric machine 12, shown in block form in FIG. 4, may be the voltage regulator 14 shown in FIG. 2 and the dynamoelectric machine 12 shown in FIG. 1, or any other suitable regulator and dynamoelectric machine may be used.

In all of the embodiments of the invention, a capacitor or other means of spike suppression (not shown) may be connected from terminal 64 of voltage regulator 14 to junction 78, to limit spike voltages which may be produced due to the switching action of the semiconductors in the voltage regulator 14.

Thus, there has been disclosed a new and improved electrical power generating system which reduces the duty cycle of the power amplifier in the regulator circuit by fifty percent, compared to conventional arrangements, reduces the number of leads between the voltage regulator, and the source of potential and dynamoelectric machine, and eliminates the conventional rectifier circuit with its heat dissipating power diodes between the source of potential and the exciter field winding. Thus, the efficiency of the regulating system has been increased, and the cost, size and weight of the system has been decreased, which makes the system particularly advantageous for use in electrical power generating systems for aircraft, where size, cost and weight are particularly important. Further, the above advantages are obtained without sacrificing system reliability and performance. In fact, the elimination of an interconnecting lead, and the elimination of the power diodes between the source of alternating potential and the exciter field winding makes the system more reliable, by eliminating components whose failure could result in failure of the complete electrical power generating system.

Since numerous changes may be made in the above described apparatus and different embodiments of the invention may be made without departing from the spirit thereof, it is intended that all matter contained in the foregoing description or shown in the accompanying drawings shall be interpreted as illustrative, and not in a limiting sense.

I claim as my invention:

1. An electrical power generating system comprising, a dynamoelectric machine including output terminals and a field winding having first and second terminals, a voltage regulator including a power amplifier having first and second terminals and conductive and non-conductive conditions responsive to the output potential at the output terminals of said dynamoelectric machine, said power amplifier allowing current flow from its first to its second terminals when in its conductive condition, an AC generator including a winding having first and second output terminals for providing an alternating potential, an asymmetrically conductive device having first and second terminals, said asymmetrically conductive device allowing current flow from its first to its second terminal, the first and second output terminals of said AC generator being connected to the first terminals of said power amplifier and asymmetrically conductive device, respectively, the second terminals of said power amplifier and asymmetrically conductive device being connected to the second terminal of said field winding, the first terminal of said field winding being connected to a predetermined point on the winding of said AC generator, the frequency of said AC generator being selected to provide a predetermined relationship with the time constant of said field winding.

2. The electrical power generating system of claim 1, wherein the first terminal of said field winding is connected to the first output terminal of said AC generator.

3. An electrical power generating system comprising, a dynamoelectric machine including output terminals and a field winding having first and second terminals, a voltage regulator including a power amplifier having first and second terminals and conductive and non-conductive conditions responsive to the output potential at the output terminals of said dynamoelectric machine, said power amplifier allowing current flow from its first to its second terminal when in its conductive condition, a source of alternating potential including an output winding having first and second output terminals and a midtap, an asymmetrically conductive device having first and second terminals, said asymmetrically conductive device allowing current flow from its first to its second terminal, said source of alternating potential having its first terminal connected to the first terminal of said power amplifier and its second terminal connected to the first terminal of said asymmetrically conductive device, the second terminals of said power amplifier and asymmetrically conductive device being connected to the second terminal of said field winding, the first terminal of said field winding being connected to the midtap of said source of alternating potential, the frequency of said source of alternating potential being selected to provide a predetermined relationship with the time constant of said field winding.

4. The electrical power generating system of claim 1, wherein the first terminal of said field winding is connected to the second output terminal of said AC generator.

5. An electrical power generating system comprising, a dynamoelectric machine having output terminals and a field winding, a voltage regulator including a power amplifier having first and second terminals and conductive and non-conductive conditions responsive to the output potential at the output terminals of said dynamoelectric machine, said power amplifier allowing current flow from its first to its second terminal when in its conductive condition, a permanent magnet generator including an output winding having first and second terminals for providing an alternating potential, an asymmetrically conductive device having first and second terminals, said asymmetrically conductive device allowing current flow from its first to its second terminals, said permanent magnet generator having its first terminal connected to the first terminal of said power amplifier and its second terminal connected to the first terminal of said asymmetrically conductive device, the second terminal of said permanent magnet generator also being connected in circuit relation with said voltage regulator to provide a source of alternating potential for said voltage regulator, the second terminals of said power amplifier and asymmetrically conductive device being connected to one end of said field winding, the other end of said field winding being connected in circuit relation with the output winding of said permanent magnet generator, the frequency of said source of alternating potential being selected to provide a predetermined relationship with the time constant of said field winding.

6. An electrical power generating system comprising a dynamoelectric machine having output terminals and a field winding, a voltage regulator including a power amplifier having first and second terminals and conductive and non-conductive conditions responsive to the output potential at the output terminals of said dynamoelectric machine, said power amplifier allowing current flow from it first to its second terminals when in its conductive condition, a permanent magnet generator including an output winding having first and second terminals for providing an alternating potential, an asymmetrically conductive device having first and second terminals, said asymmetrically conductive device allowing current flow from its first to its second terminal, said permanent magnet generator having its first terminal connected to the first terminal of said power amplifier and its second terminal connected to the first terminal of said asymmetrically conductive device, the second terminal of said permanent magnet generator also being connected in circuit relation with said voltage regulator to provide a source of alternating potential for said voltage regulator, the second terminals of said power amplifier and asymmetrically conductive device being connected to one end of said field winding, the other end of said field winding being connected to the first terminal of said power amplifier, the output frequency of said permanent magnet generator being selected to provide a predetermined relationship with the time constant of the field winding.

7. An electrical power generating system comprising a dynamoelectric machine having output terminals and a field winding, a voltage regulator including a power amplifier having first and second terminals and conductive and non-conductive conditions responsive to the output potential at the output terminals of said dynamoelectric machine, said power amplifier allowing current flow from its first to its second terminal when in its conductive condition, a permanent magnet generator including an output winding having first and second terminals and a tap connection for providing an alternating potential, an asymmetrically conductive device having first and second terminals, said asymmetrically conductive device allowing current flow from its first to its second terminals, said permanent magnet generator having its first terminal connected to the first terminal of said power amplifier and its second terminal connected to the first terminal of said asymmetrically conductive device, the second terminal of said permanent magnet generator also being connected in circuit relation with said voltage regulator to provide a source of potential for the operation of said voltage regulator, the second terminals of said power amplifier and asymmetrically conductive device being connected to one end of said field winding, the other end of said field winding being connected to the tap connection on the output winding of said permanent magnet generator, the output frequency of said permanent magnet generator being selected to provide a predetermined relationship with the time constant of the field winding.

8. An electric power generating system comprising a dynamoelectric machine having output terminals and a field winding, a voltage regulator including a power amplifier having first and second terminals and conductive and nonconductive conditions responsive to the output potential of the output terminals of said dynamoelectric machine, said power amplifier allowing current flow from its first to its second terminal when in its conductive condition, a permanent magnet generator including an output winding having first and second terminals for providing an alternating potential, an asymmetrically conductive device having first and second terminals, said asymmetrically conductive device allowing current flow from its first to its second terminals, said permanent magnet generator having its first terminal connected to the first terminal of said power amplifier and its second terminal connected to the first terminal of said asymmetrically conductive device, the second terminal of said permanent magnet generator also being connected in circuit relation with said voltage regulator to provide a source of potential for the operation of said voltage regulator, the second terminals of said power amplifier and asymmetrically conductive device being connected to one end of said field winding, the other end of said field winding being connected to the first terminal of said asymmetrically conductive device.

References Cited

UNITED STATES PATENTS

| 3,173,077 | 3/1965 | Kirk et al. | 322—28 X |
| 3,249,847 | 3/1966 | Hartman et al. | 322—25 X |
| 3,268,796 | 3/1966 | Steinbruegge | 322—28 |
| 3,323,936 | 5/1967 | Runyan | 322—32 X |

MILTON O. HIRSHFIELD, *Primary Examiner.*

J. D. TRAMMELL, *Assistant Examiner.*